(12) United States Patent
Toth

(10) Patent No.: US 7,816,469 B2
(45) Date of Patent: Oct. 19, 2010

(54) PROCESS FOR PRODUCING POLYMER NANODISPERSIONS

(75) Inventor: Alan Edward John Toth, Burlington (CA)

(73) Assignee: Xerox Corporation, Norwalk, CT (US)

( * ) Notice: Subject to any disclaimer, the term of this patent is extended or adjusted under 35 U.S.C. 154(b) by 656 days.

(21) Appl. No.: 11/609,651

(22) Filed: Dec. 12, 2006

(65) Prior Publication Data

US 2008/0139767 A1 Jun. 12, 2008

(51) Int. Cl.
*C08F 34/04* (2006.01)
*C08L 81/00* (2006.01)

(52) U.S. Cl. ............... 526/256; 524/457; 524/609; 257/40; 106/13; 106/11

(58) Field of Classification Search ........... 526/256; 257/40; 106/31.13, 11, 13; 524/457, 609
See application file for complete search history.

(56) References Cited

U.S. PATENT DOCUMENTS

| 6,621,099 | B2 | 9/2003 | Ong et al. |
| 6,770,904 | B2 | 8/2004 | Ong et al. |
| 6,803,262 | B2 | 10/2004 | Wu et al. |
| 6,890,868 | B2 | 5/2005 | Wu et al. |
| 7,005,672 | B2 | 2/2006 | Wu et al. |
| 2003/0160234 | A1 | 8/2003 | Ong et al. |
| 2005/0124784 | A1 | 6/2005 | Sotzing |
| 2006/0081841 | A1 | 4/2006 | Wu et al. |

FOREIGN PATENT DOCUMENTS

| EP | 1 329 474 A1 | 7/2003 |
| EP | 1 705 200 A1 | 9/2006 |
| WO | WO 02/078674 A1 | 10/2002 |
| WO | WO 2005/023922 A1 | 3/2005 |
| WO | WO 2006/051572 A2 | 5/2006 |

OTHER PUBLICATIONS

T. Yamamoto, et al., "Extensive Studies on π-Stacking of Poly(3-alkylthiophene-2,5-diyl)s and Poly(4-alkylthiazole-2,5-diyl)s by Optical Spectroscopy, NMR Analysis, Light Scattering Analysis and X-ray Crystallography", *J. Am. Chem. Soc.*, (1998), vol. 120, pp. 2047-2058.

Jul. 19, 2010 Canadian Office Action issued in corresponding Canadian Application No. 2,613,693.

*Primary Examiner*—Duc Truong
(74) *Attorney, Agent, or Firm*—Oliff & Berridge, PLC

(57) ABSTRACT

This disclosure is generally directed to a batch process of producing semi-conductive polymer nanodispersions in which a composition comprising a liquid and a polymer is at least partially dissolved in the liquid, resulting in dissolved polymer molecules in the composition, wherein the dissolution occurs in a dissolution vessel. The solubility of the dissolved polymer molecules in the composition is then increased to increase the concentration of dissolved polymer in the composition to a range from about 0.1% to about 30% based on a total weight of the polymer and the liquid, wherein increasing the solubility of the dissolved polymer in the composition occurs in a dissolution vessel. The dissolved polymer in the composition is then diluted with a diluent, wherein the dissolution of the dissolved polymer in the composition occurs by addition of the composition to the diluent in a precipitation vessel.

20 Claims, No Drawings

US 7,816,469 B2

PROCESS FOR PRODUCING POLYMER NANODISPERSIONS

STATEMENT REGARDING FEDERALLY SPONSORED RESEARCH OR DEVELOPMENT

This invention was made with United States Government support under Cooperative Agreement No. 70NANBOH3033 awarded by the National Institute of Standards and Technology (NIST). The United States Government has certain lights in the invention.

TECHNICAL FIELD

This disclosure is generally directed to a batch process of producing semi-conductive polymer nanodispersions, and in embodiments, to ink-jet printable polythiophene dispersions for use in electronic devices.

RELATED APPLICATIONS

U.S. Patent Publication No. 2006/0081841 A1 to Wu et al. discloses a composition including a polymer and a liquid, wherein the polymer exhibits lower solubility in the liquid at room temperature but exhibits greater solubility in the liquid at an elevated temperature, wherein the composition gels when the elevated temperature is lowered to a first lower temperature without agitation, wherein the viscosity of the composition results from a process comprising (a) dissolving at the elevated temperature at least a portion of the polymer in the liquid; (b) lowering the temperature of the composition from the elevated temperature to the first lower temperature; and (c) agitating the composition to disrupt any gelling, wherein the agitating commences at any time prior to, simultaneous with, or subsequent to the lowering the elevated temperature of the composition to the first lower temperature, wherein the amount of the polymer dissolved in the liquid at the elevated temperature ranges from about 0.2% to about 5% based on the total weight of the polymer and the liquid.

The disclosure of the foregoing publication is hereby incorporated by reference herein in its entirety. The appropriate components and process aspects of the foregoing publication may also be selected for the present compositions and processes in embodiments thereof.

REFERENCES

U.S. Pat. No. 6,803,262 to Wu et al. discloses a process comprising: creating a composition comprising a liquid and a self-organizable polymer at least partially dissolved in the liquid, resulting in dissolved polymer molecules; reducing the solubility of the dissolved polymer molecules to induce formation of structurally ordered polymer aggregates in the composition, depositing a layer of the composition including the structurally ordered polymer aggregates; and drying at least partially the layer to result in a structurally ordered layer, wherein the structurally ordered layer is part of an electronic device and the structurally ordered layer exhibits increased charge transport capability.

U.S. Pat. No. 6,890,868 to Wu et al. discloses a process comprising: selecting a composition including a polymer and a liquid, wherein the polymer exhibits lower solubility in the liquid at room temperature but exhibits greater solubility in the liquid at an elevated temperature, wherein the composition gels when the elevated temperature is lowered to a first lower temperature without agitation; dissolving at the elevated temperature at least a portion of the polymer in the liquid; lowering the temperature of the composition from the elevated temperature to the first lower temperature; agitating the composition to disrupt any gelling, wherein the agitating commences at any time prior to, simultaneous with, or subsequent to the lowering the elevated temperature of the composition to the first lower temperature; depositing via solution coating a layer of the composition wherein the composition is at a second lower temperature lower than the elevated temperature; and drying at least partially the layer.

U.S. Pat. No. 7,005,672 to Wu et al. discloses a thin film transistor comprising: an insulating layer; a gate electrode; a semiconductor layer including coalesced structurally ordered polymer aggregates of a self-organizable polymer, wherein the self-organizable polymer is of a type capable of gelling; a source electrode; and a drain electrode, wherein the insulating layer, the gate electrode, the semiconductor layer, the source electrode, and the drain electrode are in any sequence as long as the gate electrode and the semiconductor layer both contact the insulating layer, and the source electrode and the drain electrode both contact the semiconductor layer.

The disclosures of each of the foregoing patents are hereby incorporated by reference herein in their entireties. The appropriate components and process aspects of the each of the foregoing patents may also be selected for the present compositions and processes in embodiments thereof.

BACKGROUND

Polymer dispersions have many applications, such as in the manufacture of semiconductors for use in electronic devices, e.g., thin film transistors. Typical polymer nanodispersions for use in semiconductors in electronic devices are costly and difficult to prepare in large quantities. Previous methods for producing polymer nanodispersions have been disclosed in U.S. Pat. Nos. 6,803,262, 6,890,868, and 7,005,672, and Copending Application US2006/0081841A1.

In practice, the previously devised methods for making the polymer dispersion utilize PQT-12 as the polymer, and consist of three basic steps:

1. Dilution of up to 200 ml of 0.3% solution of polythiophene in dichlorobenzene at about 70° C. to ensure complete dissolution;
2. Ultrasonic precipitation by immersion of the dissolution vessel in a chilled ultrasonic bath for about three minutes or less; and
3. Filtration of the resulting polymer nanodispersion through a 0.7μ pore size glass fiber filter paper using a syringe filter.

Problematically, step 2 is limited by the inability to rapidly cool the dissolution vessel due to the cooling surface of the vessel as a function of its volume. This limitation makes infeasible the production of large quantities of commercial product. For example, only approximately 250 milliliters of solution are produced per batch utilizing these methods. There exists a need for a process whereby polymer nanodispersions can be produced in larger quantities that are less costly.

SUMMARY

This disclosure describes a process for producing polymer nanodispersions that, in embodiments, is independent of scale.

This disclosure is generally directed to a process of producing polymer nanodispersions, and in embodiments, to inkjet printable polythiophene dispersions for use in electronic devices, e.g., thin film transistors. The process includes first making a concentrate of polymer, then combining the polymer with a liquid (e.g., solvent) in a dissolution vessel. The composition is then elevated and maintained at a temperature of about 50 to 80° C., and agitated so that complete dissolution of the polymer occurs. The concentrated hot polymer solution is then added, at a controlled rate, to diluent that has been prechilled in a precipitation vessel. The resultant concentration of polymer in the precipitation vessel is designed to be appropriate for use in inkjet printing or in similar processes and devices used to print circuit boards. After combining the hot polymer and diluent in the precipitation vessel, the precipitation vessel may then be further chilled, and may subject the solution to additional agitation, e.g., ultrasonication and/or stirring. Thus, when the hot polymer concentrate is combined with the colder diluent in the precipitation vessel, its heat is rapidly dissipated so as to form a precipitate of sufficiently small particle size. If the temperature of the precipitation vessel is too high, the feed of hot dissolved polymer concentrate can be interrupted in order to allow chilling of the precipitation vessel, and the process can be restarted at a lower temperature.

DETAILED DESCRIPTION OF EMBODIMENTS

This disclosure describes a process for producing polymer nanodispersions that, in embodiments, is independent of scale. That is, the process in embodiments can be performed at laboratory scale, or can be readily scaled up to commercial scale.

Any suitable polymer may be used in this process. The polymer may be considered to exhibit poor solubility in a liquid when the concentration of the polymer in a saturated solution in that liquid is not high enough to make a thin polymer layer that is useful for the intended applications by common deposition techniques Generally, when the concentration of the polymer in a particular liquid is below about 0.1 percent by weight, its solubility in that liquid is deemed to be poor. Even though the polymer may exhibit low solubility in a liquid at room temperature, its solubility can generally be increased by heating above room temperature.

When the concentration is higher than about 0.2 percent by weight, the polymer is considered to exhibit reasonable solubility, as a useful thin polymer layer may be fabricated from this solution using common deposition processes.

The phrase "room temperature" refers to a temperature in the normal range of room temperature, such as about 25° C.

In embodiments, one, two, three or more different polymers may be employed.

The polymer may be for example a self-organizable polymer. Molecular self-organization refers to the ability of molecules to organize themselves into a higher molecular structural order in response to a stimulus such as a change in solvency of the liquid for the polymer. The polymer may also be, for example, a semi-conducting or a conjugated polymer. In embodiments, the polymer may be both self-organizable and semi-conducting. Self-organizable polymers include for example conjugated polymers such as for instance polythiophenes. Exemplary polythiophenes include the following:

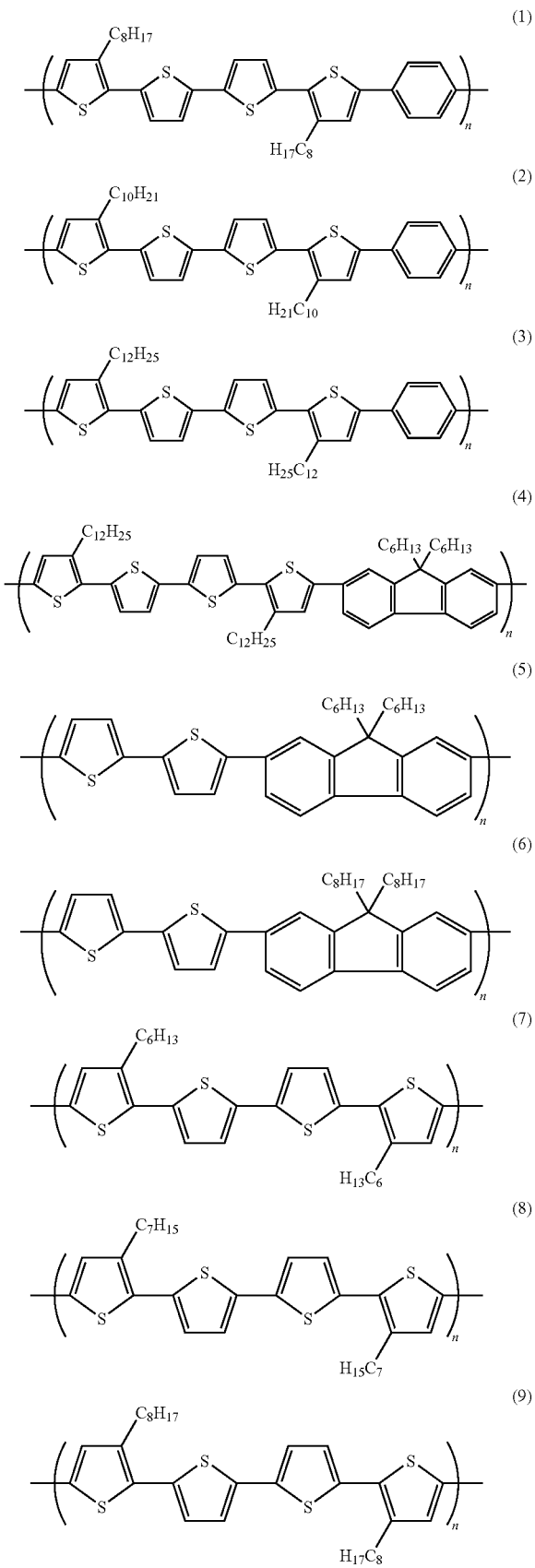

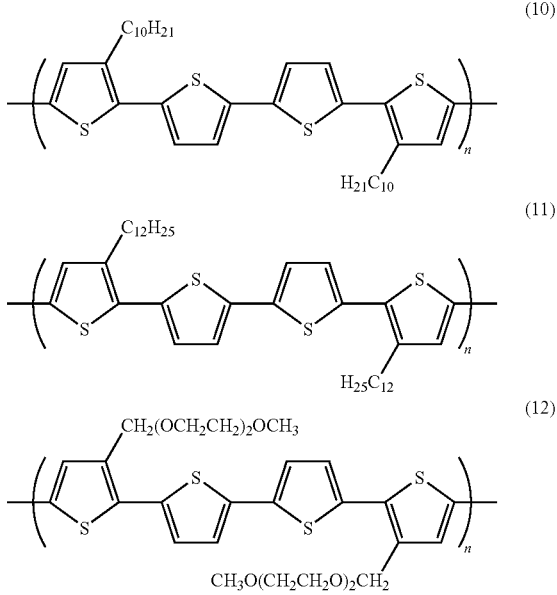

where n is from about 5 to about 5,000, such as from 5 to 500, or from 10 to 100. Specifically, PQT-12 may be used, in which n is 40.

Suitable polythiophenes are disclosed in U.S. Pat. Nos. 6,621,099 and 6,770,904, and US Published Application No. 2003/0160234, the disclosures of which are totally incorporated herein by reference.

In embodiments, the polymer is dissolved in a liquid at an elevated temperature inside a dissolution vessel. The composition in the dissolution vessel may also be agitated to aid dissolution of the polymer. The concentration and/or temperature of the composition in the dissolution vessel is then lowered by addition of the composition in the dissolution vessel to a diluent in a precipitation vessel. The temperature of the resultant combined composition and diluent in the precipitation vessel may then be further lowered at any time simultaneous with, or subsequent to addition of the composition to the diluent in the precipitation vessel. For example, the temperature of the precipitation vessel may be lowered to counteract any temperature increase caused by addition of the composition to the diluent. The combined composition and diluent in the precipitation vessel may also be further agitated to encourage precipitation of sufficiently small particles.

As used herein, the term "composition" refers to the combined polymer and liquid in the dissolution vessel.

In the composition, the polymer or polymers are completely dissolved or partially dissolved in a liquid at an elevated temperature. Agitation may be optionally employed to aid the dissolution. As used herein, the term "agitation" may refer to any means of agitation. Exemplary agitation methods include, for instance: stirring and homogenization with the mixing speed ranging for example from about 100 rpm to about 5000 rpm, such as from about 300 rpm to 1000 rpm; and ultrasonic vibration with a sonicator wattage ranging for example from about 100 W to about 400 W, such as 100-200 W, and a sonicator frequency ranging for example from about 20 kHz to about 42 kHz, such as 25-38.5 kHz.

In embodiments, the polymer may be completely dissolved. Any undissolved polymer may be optionally removed by filtration. The amount of the polymer dissolved in the liquid at the elevated temperature may range for example from about 0.1% to as much as about 50% by weight based on the total weight of the liquid and the polymer. In embodiments, the concentration of the polymer dissolved in the liquid at the elevated temperature ranges for example from about 0.1% to about 30%; by weight, such as from about 0.2% to about 5% by weight. In the comparative examples the polymer concentration ranged from 0.3 to 2.4%.

The liquid may be, for instance, dichloroethane, chloroform, tetrahydrofuran, chlorobenzene, dichlorobenzene, trichlorobenzene, nitrobenzene, toluene, xylene, mesitylene, 1,2,3,4-tetrahydronaphthelene, dichloromethane, 1,2-dichloroethane trichloroethane, 1,1,1,2-chloroethane, or a mixture thereof. Other suitable liquids can also be used.

Heat is employed to aid the dissolution of the polymer at an elevated temperature for a period of time ranging for instance from about 1 minute to about 24 hours, such as from about 10 minutes to about 4 hours. As used herein, the phrase "elevated temperature" refers to a temperature ranging from above room temperature to the boiling point or higher of the chosen liquid (at one atmosphere or higher pressure), for example from about 40 to about 180° C., such as from about 50 to about 120° C.

Although the composition can be used for device preparation at the elevated temperature, use at elevated temperatures may increase the manufacturing cost. Thus, to lower the manufacturing cost, the temperature of the composition is lowered. The lower temperature may be any temperature below the elevated temperature such as, for example, from about 10 to about 60° C., or from about 20 to about 30° C., and, in embodiments, at room temperature.

In embodiments, the concentration and temperature of the composition may be first elevated in a dissolution vessel. The temperature and/or the concentration of the composition may then be reduced by dilution with a diluent in a separate precipitation vessel. The concentration of the composition in the dissolution vessel may be, for instance be about 1% to 50% polymer solution, such as 0.20% to 5%, and the concentration of polymer in the diluent in the precipitation vessel may be, for instance about 0% to 10%, such as 0%. The temperature of the composition in the dissolution vessel is higher than the temperature of the diluent in the precipitation vessel. For example, the temperature of the composition contained in the dissolution vessel may be for instance about 10 to 150° C., such as 20 to 80° C., and the temperature of the liquid in the precipitation vessel may be for instance, about −40 to 40° C., such as −10 to 5° C.

The diluent may be the same as, or different than, the liquid, and may be for instance, dichloroethane, chloroform, tetrahydrofuran, chlorobenzene, dichlorobenzene, trichlorobenzene, nitrobenzene, toluene, xylene, mesitylene, 1,2,3, 4-tetrahydronaphthelene, dichloromethane, 1,2-dichloroethane trichloroethane, 1,1,2,2-chloroethane, or a mixture thereof. Other suitable liquids can also be used.

To encourage a precipitation of small particles, the composition is subjected to agitation at a lower temperature, wherein agitation commences at any time prior to, simultaneous with, or subsequent to lowering the temperature of the composition in the precipitation vessel. The agitation is maintained for a sufficient time to disrupt any gelling and/or particle agglomeration and encourage a precipitation of small particles, such as an agitation time ranging, for instance from about 5 minutes to about 20 hours, such as from about 10 minutes to 1 hour. The intensity of the agitation may be constant or may vary throughout the agitation time. Exemplary agitation methods include, for instance: stirring and homogenization with the mixing speed ranging for example from about 100 rpm to about 5000 rpm, such as from about 300 rpm to 1000 rpm; and ultrasonic vibration with a sonicator wattage ranging for example from about 100 W to about 400 W, such as 100-200 W, and a sonicator frequency ranging for example from about 20 kHz to about 42 kHz, such as 25-38.5 kHz.

In embodiments, the volume of the composition in the dissolution vessel may be equal to, or different than, the volume of diluent in the precipitation vessel. For example, a volume ratio of the volume of composition in the vessel to volume of diluent in the precipitation vessel may be from about 1:1 to about 1:20, such as about 1:5 to about 1:15, or about 1:10. Thus, for example, where the volume of the composition in the dissolution vessel is about 1 liter, then the volume of diluent in the precipitation vessel may be from about 1 to about 20 liters, such as from about 5 to about 15 liters, or about 10 liters. Of course, ratios outside these ranges may be used, if desired. In embodiments, the composition in the dissolution reactor may be added to the liquid in the precipitation reactor at a controlled rate and may be interrupted if necessary.

In embodiments, the temperature of the composition is lowered from an elevated temperature by an amount ranging for instance from about 10 to about 150° C., such as from about 20 to about 80° C. After dilution with the diluent, the composition is maintained at the lower temperature for a time period ranging for example from about 10 minutes to about 10 hours, such as from about 30 minutes to about 4 hours.

In embodiments of the present process, the polymer molecules may come together to form structurally ordered polymer aggregates in the liquid during the agitation. The polymer aggregates are for example nanometer sized with a size ranging for instance from about 10 nm to about 500 nm, such as from about 150 nm to about 300 nm.

When a self-organizable polymer is used, the polymer aggregates in the liquid may exhibit in embodiments structural ordering, yielding structurally ordered polymer aggregates. The phrase "structurally ordered polymer aggregates" refers to the aggregation of polymer molecules wherein the spatial orientations or arrangements of the molecules relative to their surrounding neighboring molecules within the aggregation are orderly in nature. For instance the polymer molecules may align themselves with their backbones parallel to one another. Changes in molecular ordering of the polymer in a composition may be monitored by spectroscopic methods, for instance, absorption spectroscopy, optical spectroscopy, NMR, light scattering and X-ray diffraction analysis, and by transmission electron microscopy. A known example is regioregular poly(3-alkylthiophene-2,5-diyl)s which forms π-stacked lamellar structures as a result of its side chain alignment as disclosed in the reference, "Extensive Studies on π-Stacking of Poly(3-alkylthiophene-2,5-diyl)s and Poly (4-alkylthiazole-2,5-diyl)s by Optical Spectroscopy, NMR Analysis, Light Scattering Analysis and X-ray Crystallography" by T. Yamamoto, et al., T. Am. Chem. Soc. (1998), Vol. 120, pp. 2047-2058. The existence of the structural order (of the polymer aggregates) is supported by for example spectroscopy where in an absorption spectrum the absorption maxima shifts toward longer wavelengths together with the appearance of absorption fine structures (e.g., vibronic splitting). In embodiments, the formation of polymer aggregates was verified by absorption spectroscopy measurement and by direct observation under transmission electron microscopy.

In embodiments, the composition may be a dispersion including the polymer aggregates and the liquid, wherein the dispersion may be stable for a period of time ranging for example from less than one hour to more than one year. The stability of the dispersion refers to its visual clarity with no visible separation into solid and liquid phases and/or the ability to filter the dispersion following agitation after a period of undisturbed rest.

In embodiments, the optimal final polymer dispersion is, for example, 0.3%-PQT-12 and dichlorobenzene. PQT-12 is soluble in hot dichlorobenzene at much higher concentrations than 0.3%, such as, for example, approximately 2-5%. Complete dissolution of PQT-12 will occur between 60 and 80° C.

In embodiments, the present process may be used whenever there is a need to form a semiconductor layer in an electronic device. The phrase "electronic device" refers to micro- and nano-electronic devices such as, for example, micro- and nano-sized transistors and diodes. Illustrative transistors include for instance thin film transistors, particularly organic field effect transistors. The present process, however, may be used not just in fabricating electronic devices but in any process where it is necessary to produce polymer nanodispersions.

An example is set forth hereinbelow and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLE 1

In the following examples, a polythiophene having the structural formula (II) was used for illustration.

Synthesis of Polythiophene: Charge 132 g of ferric chloride and 1100 ml of chlorobenzene to a 5 L glass jacketed reactor. Start a $N_2$ blanket and stirring. Make a solution of 110 g of the above-indicated quaternary thiophene and 3300 ml of chlorobenzene. Add this solution to the reactor over 5 minutes with an addition funnel. Set jacket setpoint to about 66-67° C. so as to maintain a temperature of 65 C±0.5 C. Keep the temperature as close to 65° C. as possible by adjusting the setpoint as needed. Maintain the 65° C. profile for 48 hours. After 48 hours, let the composition cool to room temperature.

Crude Polymer Work-Up: Because of the equipment size available, the composition is split into 4 equal parts for the rest of the procedure. Add 2 L of chlorobenzene and 1.5 L of DIW to one part of the composition, heating to 58° C. with mechanical stirring. Discharge the reaction mixture to a 6 l, separatory funnel, shake well and let separate for 5 minutes. Safely dispose of the acidic aqueous phase. Recharge the recovered organic phase with 1.5 L of DIW to a 5 L glass jacketed reactor connected to a bath set at 60° C. and heat to 58° C. with stirring. Discharge to a 6 L separatory tunnel for separation of aqueous/organic phases. Repeat the 1.5 L DIW washes until clear and colorless (typically 7 times total). Measure the pH of the filtrate and dispose. Prepare an aqueous solution of ammonium hydroxide by diluting 62.5 ml to 1.5 L with DIW. Use this aqueous $NH_4OH$ to wash the chlorobenzene/polymer solution. Safely dispose of the basic aqueous waste. Resume 1500 ml DIW washes checking the pH after each wash until the filtrate is clear, colorless and pH is 7±1. This typically takes 4 washes after the $NH_4OH$ wash.

Polymer Recovery: Reheat the organic phase under nitrogen to 58° C. in the 5 L reactor by setting the jacket temperature to 60° C. Add 3.1 L of methanol to a 10 L pail with mechanical stirring. Add the hot polymer/chlorobenzene solution to a separatory funnel maintaining the temperature above 50° C. Start mechanical stirring the methanol then slowly add the hot polymer/chlorobenzene from the separatory funnel over about 20 minutes to obtain a purple slurry containing the crude polymer. Let this settle (or centrifuge) then filter with an 18 cm Buckner tunnel (#30 glass fiber filter paper) to recover crude polymer. After filtration, wash on the filter three times with 200 ml of methanol followed by re-slurry in 1 L of methanol, then again wash on the filter three times with 200 ml of methanol. Dry at least 24 to 48 hours in a vacuum oven at a temperature of from 20° C. to 50° C. Repeat with the second, third and forth quarters in a similar manner. Yield is 103.3 g or 93.9% (typically 90-92%). No further purification was done.

COMPARATIVE EXAMPLE 1

The following control utilizes a PQT-12 Polymer produced using the same formulation and processing conditions as in Example 1 above. The nanodispersion is produced by combining 0.6 g PQT-12 Polymer with 200 g 1,2-Dichlorobenzene. The composition is charged to a 250 ml 3-neck round bottom flask, subjected to a heating mangle, an atmosphere of $N_2$ @ 1SCFH, and is mechanically stirred. The composition is maintained at 75° C. and stirred at 300 rpm for 1 hour in order to accomplish complete dissolution.

After 1 hour, the solution is clear, and has a rust red color. The heating mantle is removed and replaced with an ultrasonic bath which is pre-chilled to −5° C. The vessel is immersed in the low temperature ultrasonic bath while the composition is stirred, such that it cools to room temperature within 2-3 minutes. The composition is then stirred for 15 minutes below room temperature under sonication.

The batch is filtered using a 500 ml SS 300 ml pressure filter fitted with GF/F (0.7μ pore size) glass fiber filter paper, and the filtrate is collected and stored in an amber glass bottle under $N_2$.

The resulting mobility of the dispersant is greater than 0.07 $cm^2$/V.s.

EXAMPLE 2

The new scaleable nanodispersion procedure described herein utilizes 0.6 g PQT-12 Polymer and 150 g 1,2-Dichlorobenzene in the dissolution vessel, and 50 g 1,2-Dichlorobenzene in the precipitation vessel. A PQT-12 Polymer is prepared using the same formulation and processing conditions as described in Example 1 above. The composition is charged to a 250 ml 3-neck round bottom flask, subjected to a heating mangle, an atmosphere of $N_2$ @ 1SCFH, and is mechanically stirred. The composition is then maintained at 75° C. and stirred at 300 rpm for 1 hour in order to accomplish complete dissolution. 50 g of dichlorobenzene is then added to a second 250 ml 3-neck flask, i.e., a precipitation vessel, which is suspended in an ultrasonic bath and cooled to about −2° C. by the addition of ice. This cold solvent is stirred under 1 SCFH $N_2$ at 300 rpm.

After 1 hour, the solution in the dissolution vessel is a clear, rust-red color. The composition is then transferred from the dissolution vessel to the precipitation vessel at about 10 ml/minute, while being subject to stirring and ultrasonication. The rate of transfer is such that the addition takes about 15 minutes to complete. The internal temperature of the precipitation vessel is not allowed to exceed 10° C. Once transferred, the composition is then stirred for an additional 10 minutes in order to raise the temperature to about 22° C.

The dispersion is then filtered using a 500 ml SS 300 ml pressure filter fitted with GF/F (0.7μ pore size) glass fiber filter paper. The filtrate is collected and stored in an amber glass bottle under $N_2$. The mobility is greater than 0.07 $cm^2$/V.s

EXAMPLE 3

This example describes an 8× scale-up of an aspect of the scaleable procedure described herein. It utilizes 4.8 g PQT-12 Polymer and 200 g 1,2-Dichlorobenzene in the dissolution vessel (2.4% wt/wt), and 1400 g 1,2-Dichlorobenzene in the precipitation vessel. A PQT-12 Polymer is prepared using the same formulation and processing conditions as described in Example 1 above. The composition is charged to a 250 ml 3-neck round bottom flask, subjected to a heating mangle, an atmosphere of $N_2$ @ SUCH, and is mechanically stirred. The composition is then maintained at 75° C. and stirred at 300 rpm for 2 hours in order to assure complete dissolution. 1400 g of dichlorobenzene is then added to a 3 L, 3-neck flask, i.e., a precipitation vessel, which is suspended in an ultrasonic bath and cooled to about −2° C. by the addition of ice to the bath. This cold solvent is stirred under 1 SCFH $N_2$ at 250 rpm.

After 2 hours, the solution in the dissolution vessel is a clear, rust-red color. The composition is then transferred from the dissolution vessel to the precipitation vessel at about 10 ml/minute, while being subject to stirring and ultrasonication. The rate of transfer is such that the addition takes about 20 minutes to complete. The internal temperature of the precipitation vessel is not allowed to exceed 10° C. Once transferred, the composition is then stirred for an additional 20 minutes under continued sonication. The temperature before filtration is less than 10° C.

The dispersion is then filtered using a SS 300 ml pressure filter fitted with GF/F (0.7μ pore size) glass fiber filter paper. The filtrate is collected and stored in an amber glass bottle under $N_2$. The mobility is 0.072 $cm^2$/V.s.

| Batch # | Disp. Part. Size | Mobility |
| --- | --- | --- |
| Comparative Example 1 (control) | 10-20 nm | 0.068 to 0.08 $cm^2$/V.s. |
| Example 2 | 10-20 nm | 0.076 to 0.094 $cm^2$/V.s. |
| Example 3 | 10-20 nm | 0.072 to 0.086 $cm^2$/V.s. |

The Examples each use the same crude polymer and the same solvent. Table 1 compares Particle size (by Nicomp) and mobility of Comparative Example 1, Example 2 and Example 3. The filtrate in Comparative Example 1 is filtered easily and has a mobility of 0.068 to 0.08 $cm^2$/V.s. The primary particle size in Comparative Example 1 is 10-20 nm by Nicomp. The dispersion in Example 2 is filtered easily and has a mobility of 0.076-0.094 $cm^2$/V.s. The primary particle size in Example 2 is 10-20 nm by Nicomp. The dispersion in Example 3 is filtered easily and has a mobility of 0.072 to 0.086 $cm^2$/V.s. The primary particle size in Example 3 is 10-20 nm by Nicomp. Thus, the particles in Example 2 and Example 3 have similar particle size as the control, but exhibit greater mobility. Example 2 and Example 3 are also highly scaleable, whereas the control in Comparative Example 1 has not been demonstrated beyond this scale.

Comparative Example 1 is a control. The mobility, particle size and coating characteristics were typical of a PQT-12 particle dispersion. This process has not been successful when scaled to larger than this size. It can be assumed that 8 L or more of dispersion cannot be cooled from 75° C. to 21° C. or less in 2-3 minutes by simple immersion of the vessel in a cold sonicating bath. Therefore these dispersions are expected to be unfilterable and have low mobility. In contrast, however, we expect good nanodispersion since the polymer is instantly chilled to the desired temperature during sonication.

In Example 2, the coating characteristics, particle size, and particle mobility were similar or slightly better than the control. Thus, Example 2 demonstrates that the process retains the characteristics needed to make high mobility PQT-12 polymer dispersion but in a process that can be scaled up. In Example 2, most of the solvent in the hot polymer dissolution is not under the optimum cooling conditions, which illustrates that the process works under less than ideal conditions. Ideal conditions would include a higher volume of additional liquid in the precipitation vessel, and a more concentrated polymer solution, for example, 0.6% to 3%. This arrangement would optimize cooling capacity (i.e., the fastest and coldest precipitation conditions), and therefore the produce the smallest possible particle size with maximum mobility.

In Example 3, the coating characteristics, particle size, and particle mobility were similar or slightly better than the control. Thus, Example 3 further demonstrates that the process retains the characteristics needed to make high mobility PQT-12 polymer dispersion in a process that can be scaled up. In this example the polymer solution is much more concentrated. In Example 1, all of the 1,2-dichlorobenzene is used in the dissolution, and the polymer concentration is 0.3% wt/wt. To contrast, in Example 2, only 75% of the total 1,2-dichlorobenzene is used in the dissolution, and the rest is used in the precipitation. Therefore, this dissolution is 0.4% polymer wt/wt. Further, in Example 3, the dissolution uses only 12.5% of the total amount of 1,2-dichlorobenzene, with the remainder in the precipitation vessel. The polymer concentration of the dissolution in this example is 2.4%. This more concentrated dissolution allows more of the 1,2-dichlorobenzene to be used in the precipitation vessel. This is a significant advantage to scale-up insofar as less energy is required to keep the precipitation vessel cool due to the smaller ratio of hot polymer concentrate to diluent. This feature is critically important since, as batch size increases, the time needed to chill (or heat) a larger reactor also increases. In this manner, the energy stored in the cold 1,2-dichlorobenzene is sufficient to dissipate all the heat from the dissolution process. Thus, the limiting factor of fast heat elimination is overcome in this example, allowing the formation of very small nanodispersions. The only remaining impediment to scale-up has been the size of ultrasonication equipment required in the process. However, such large-scale sonication equipment is commonly used and widely available in industry today.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:
1. A process comprising:
   (a) providing a composition comprising a liquid and a polymer dissolved in the liquid, resulting in dissolved polymer molecules in the composition, wherein the dissolution occurs in a dissolution vessel;
   (b) increasing the solubility of the dissolved polymer molecules in the composition to increase the concentration of dissolved polymer in the composition to a range from about 0.1% to about 30% based on a total weight of the polymer and the liquid, wherein increasing the solubility of the dissolved polymer in the composition occurs in a dissolution vessel; and
   (c) diluting the dissolved polymer in the composition with a diluent, wherein the dissolution of the dissolved polymer in the composition occurs by addition of the composition to the diluent in a precipitation vessel, wherein:
      the diluent is pre-chilled such that an internal temperature of the precipitation vessel does not exceed 10° C.; and
      75% or less of the total amount of diluent used is added to the dissolution vessel with the remaining amount added to the precipitation vessel.

2. The process of claim 1, wherein the diluent is at a lower temperature than the dissolved polymer solution.

3. The process of claim 1, wherein the composition and diluent are further cooled and/or agitated to induce precipitation.

4. The process of claim 3, wherein agitation commences at any time prior to combining the dissolved polymer solution with the diluent.

5. The process of claim 3, wherein agitation commences simultaneous with combining the dissolved polymer solution with the diluent.

6. The process of claim 3, wherein agitation commences subsequent to combining the dissolved polymer solution with the diluent.

7. The process of claim 1, wherein increasing the solubility of the dissolved polymer molecules is accomplished by changing the temperature of the polymer in solution.

8. The process of claim 1, wherein the polymer is at least one of a self-organizable polymer and a semi-conductive polymer.

9. The process of claim 1, wherein the polymer is a conjugated polymer.

10. The process of claim 1, wherein the polymer is polythiophene.

11. The process of claim 1, wherein the polymer is polythiophene from the group consisting of:

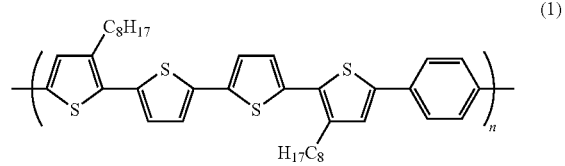

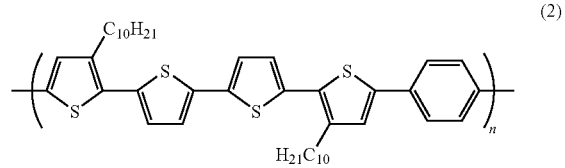

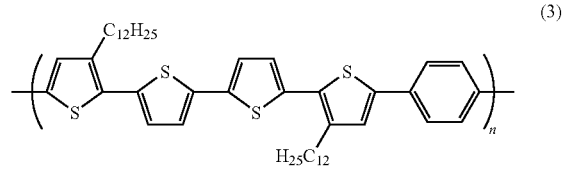

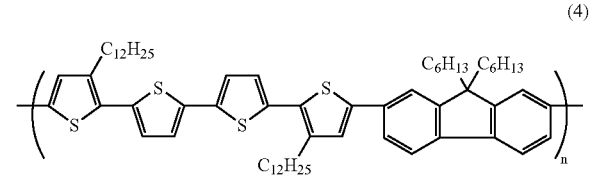

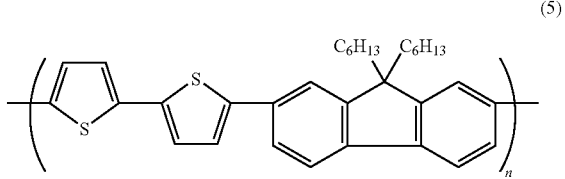

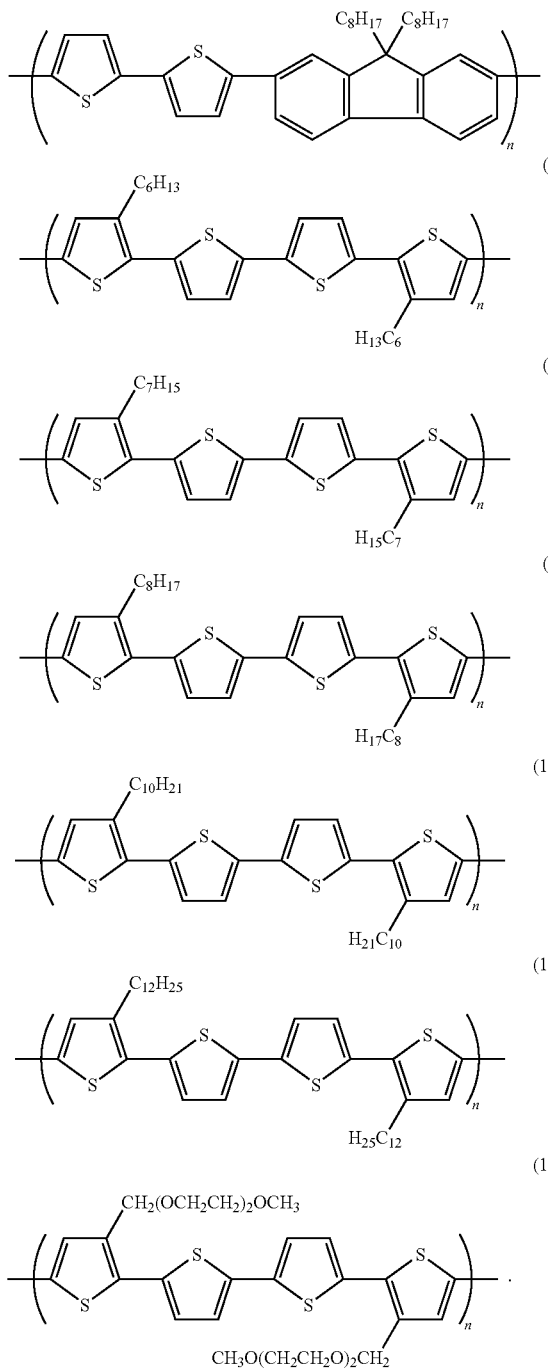

12. The process of claim 1, wherein the polymer is a semiconductor.

13. The process of claim 1, wherein the diluent has the same composition as the liquid.

14. The process of claim 1, wherein the respective volumes of the composition and diluent combined in the precipitation vessel ranges from 1:1 to 1:15 by volume based on the total volume of the liquid and the dissolved polymer.

15. The process of claim 1, wherein the liquid is selected from the group consisting of dichloroethane, chloroform, tetrahydrofuran, chlorobenzene, dichlorobenzene, trichlorobenzene, nitrobenzene, toluene, xylene, mesitylene, 1,2,3,4-tetrahydronaphthalene, dichloromethane, trichloroethane, 1,2,2-chloroethane, and a mixture thereof.

16. The process of claim 1, wherein the diluent is selected from the group consisting of dichloroethane, chloroform, tetrahydrofuran, chlorobenzene, dichlorobenzene, trichlorobenzene, nitrobenzene, toluene, xylene, mesitylene, 1,2,3,4-tetrahydronaphthelene, dichloromethane, trichloroethane, 1,1,2,2-chloroethane, and a mixture thereof.

17. The process of claim 1, wherein the precipitated compounds are in sizes compatible for use in spin coating and inkjet printing.

18. The process of claim 1, wherein the composition is heated in a dissolution vessel.

19. The process of claim 1, wherein the composition is cooled in a precipitation vessel.

20. A process comprising:
(a) providing a composition comprising a solvent and a polythiopohene at least partially dissolved in the solvent, resulting in dissolved polythiopohene molecules, wherein the dissolution occurs in a dissolution vessel;
(b) increasing the solubility of the dissolved polythiophene molecules in the composition by increasing the temperature of, or agitating the composition to increase the concentration of dissolved polythiophene in the composition to a range from about 0.2% to about 5% based on a total weight of the polythiophene and the solvent, wherein increasing the solubility of the dissolved polythiophene molecules in the composition occurs in a dissolution vessel; and
(c) diluting and/or cooling the composition by addition of the composition to a diluent, wherein the dissolution occurs in a precipitation vessel, the diluent comprises the same compound as the solvent, the diluent is prechilled such that an internal temperature of the precipitation vessel does not exceed 10° C.; and
75% or less of the total amount of diluent used is added to the dissolution vessel with the remaining amount added to the precipitation vessel.

* * * * *

UNITED STATES PATENT AND TRADEMARK OFFICE
CERTIFICATE OF CORRECTION

PATENT NO. : 7,816,469 B2  
APPLICATION NO. : 11/609651  
DATED : October 19, 2010  
INVENTOR(S) : Alan E J. Toth Page 1 of 1

It is certified that error appears in the above-identified patent and that said Letters Patent is hereby corrected as shown below:

In the Specification:

Column 1, line 8, after "Cooperative Agreement No.", please delete "70NANBOH3033" and insert -- 70NANB0H3033 --.

Signed and Sealed this  
Tenth Day of September, 2013

Teresa Stanek Rea  
*Acting Director of the United States Patent and Trademark Office*